(12) United States Patent
Sasaki et al.

(10) Patent No.: US 11,280,964 B2
(45) Date of Patent: Mar. 22, 2022

(54) FUSION SPLICER AND METHOD FOR FUSION-SPLICING OPTICAL FIBERS

(71) Applicant: SUMITOMO ELECTRIC INDUSTRIES, LTD., Osaka (JP)

(72) Inventors: Dai Sasaki, Osaka (JP); Takuro Watanabe, Osaka (JP); Sho Yakabe, Osaka (JP); Takako Hosokawa, Osaka (JP)

(73) Assignee: SUMITOMO ELECTRIC INDUSTRIES, LTD., Osaka (JP)

(*) Notice: Subject to any disclaimer, the term of this patent is extended or adjusted under 35 U.S.C. 154(b) by 212 days.

(21) Appl. No.: 16/597,510

(22) Filed: Oct. 9, 2019

(65) Prior Publication Data

US 2020/0142129 A1  May 7, 2020

(30) Foreign Application Priority Data

Nov. 1, 2018  (JP) .............................. JP2018-206428

(51) Int. Cl.
*G02B 6/255* (2006.01)

(52) U.S. Cl.
CPC ......... *G02B 6/2553* (2013.01); *G02B 6/2551* (2013.01)

(58) Field of Classification Search
CPC .................................................. G02B 6/2551
See application file for complete search history.

(56) References Cited

U.S. PATENT DOCUMENTS

| 5,417,734 A * | 5/1995 | Suganuma ........... G02B 6/2835 65/408 |
| 6,817,786 B2 | 11/2004 | Sato et al. |
| 2003/0056547 A1 * | 3/2003 | Yamada ............... G02B 6/2551 65/407 |

FOREIGN PATENT DOCUMENTS

| JP | 57022214 A | * 2/1982 | .......... G02B 6/2551 |
| JP | H5-257028 | 10/1993 | |
| JP | 2002-014252 | 1/2002 | |
| JP | 2003-75678 | 3/2003 | |

* cited by examiner

*Primary Examiner* — Omar R Rojas
(74) *Attorney, Agent, or Firm* — Smith, Gambrell & Russell, LLP.

(57) ABSTRACT

A fusion splicer for fusion-splicing a first group of optical fibers and a second group of optical fibers by arc discharge is disclosed. The fusion splicer includes first and second electrode rods, first and second fiber holding parts, and a first shield. The electrode rods generate the arc discharge therebetween. The first fiber holding part has a first plurality of V-grooves positioning the first group of optical fibers. The second fiber holding part has a second plurality of V-grooves positioning the second group of optical fibers. The first shield is located between the first and second plurality of V-grooves and the first electrode rod in a direction along a center line connecting a tip of the first electrode rod to a tip of the second electrode rod. The first shield is formed of an insulating material having heat resisting properties withstanding 1000 or more degrees Celsius.

19 Claims, 11 Drawing Sheets

FUSION SPLICER AND METHOD FOR FUSION-SPLICING OPTICAL FIBERS

CROSS-REFERENCE TO RELATED APPLICATION

The present application is based upon and claims benefit of the priority from Japanese patent application No. 2018-206428, filed on Nov. 1, 2018, which is incorporated herein by reference in its entirety.

TECHNICAL FIELD

The present disclosure relates to a fusion splicer and a method for fusion-splicing optical fibers.

BACKGROUND

JPH05-257028A and JP2003-075678A disclose a method for mutually fusion-splicing optical fibers, respectively. In this method, a first group of optical fibers and a second group of optical fibers arrayed between a pair of discharging electrodes such that ends of respective fibers of the groups thereof are abutted on each other are mutually fusion-spliced by electric discharge of the pair of discharging electrodes.

SUMMARY

The present disclosure provides a fusion splicer for fusion-splicing mutually a first group of optical fibers and a second group of optical fibers arrayed such that an end of each fiber of the first group of optical fibers abuts on an end of each fiber of the second group of optical fibers, by arc discharge. The fusion splicer comprises first and second electrode rods, a first fiber holding part, a second fiber holding part, and a first shield. The first and second electrode rods are configured to generate the arc discharge therebetween. The first fiber holding part has a first plurality of V-grooves positioning the first group of optical fibers between the first and second electrode rods. The second fiber holding part has a second plurality of V-grooves positioning the second group of optical fibers between the first and second electrode rods. The first shield is located between the first and second plurality of V-grooves and the first electrode rod in a first direction along a center line connecting a first tip of the first electrode rod to a second tip of the second electrode rod. The first shield is formed of an insulating material having heat resisting properties withstanding 1000 or more degrees Celsius.

The present disclosure also provides a method for fusion-splicing mutually a first group of optical fibers and a second group of optical fibers by arc discharge generated between first and second electrode rods. The first group of optical fibers and the second group of optical fibers are arrayed such that an end of each fiber of the first group of optical fibers abuts on an end of each fiber of the second group of optical fibers. The method comprises a step of locating the first group of optical fibers, the second group of optical fibers, and a shield formed of an insulating material between the first and second electrode rods such that at least part of the shield is included in a predetermined area when viewed from an axial direction of the first group of optical fibers; and a step of generating the arc discharge between the first and second electrode rods to fusion-splicing mutually the first group of optical fibers and a second group of optical fibers, respectively, while maintaining the step of the locating. In this method, the shield is a columnar body and has heat resisting properties withstanding 1000 or more degrees Celsius. The columnar body extends along the axial direction of the first group of optical fibers. The predetermined area is an area delimited by a first border line and a second border line when viewed from the axial direction. The first border line is a tangent line of an outermost fiber of the first group of optical fibers arrayed close to the first electrode rod in a first direction along a center line connecting both tips of the first and second electrode rods each other. The tangent line is orthogonal to the center line and is formed on an inner side of the outermost fiber in a fiber-arrayed direction. The second border line is a perpendicular line to the center line and passes the tip of the first electrode rod.

BRIEF DESCRIPTION OF THE DRAWINGS

The foregoing and other purposes, aspects and advantages will be better understood from the following detailed description of embodiments of the present disclosure with reference to the drawings, in which.

DETAILED DESCRIPTION

Problem to be Solved by the Present Disclosure

In the method for fusion-splicing optical fibers disclosed in JPH05-257028A and JP2003-075678A, a fusion state of the optical fibers may vary depending on positions in arraying directions. For example, a melting amount of each of the optical fibers in the vicinity of the electrodes may become larger than a melting amount of each of the optical fibers which are away from the electrodes.

Effect of the Present Disclosure

According to the present disclosure, variation in fusion states among optical fibers which are fusion-spliced each other can be small.

Description of Embodiments of the Present Disclosure

Details of embodiments according to the present disclosure will be described. A fusion splicer according to one embodiment of the present disclosure relates to a fusion splicer for fusion-splicing mutually a first group of optical fibers and a second group of optical fibers arrayed such that an end of each fiber of the first group of optical fibers abuts on an end of each fiber of the second group of optical fibers, by arc discharge. The fusion splicer comprises first and second electrode rods, a first fiber holding part, a second fiber holding part, and a first shield. The first and second electrode rods are configured to generate the arc discharge therebetween. The first fiber holding part has a first plurality of V-grooves positioning the first group of optical fibers between the first and second electrode rods. The second fiber holding part has a second plurality of V-grooves positioning the second group of optical fibers between the first and second electrode rods. The first shield is located between the first and second plurality of V-grooves and the first electrode rod in a first direction along a center line connecting a first tip of the first electrode rod to a second tip of the second electrode rod. The first shield is formed of an insulating material having heat resisting properties withstanding 1000 or more degrees Celsius.

In a conventional fusion splicer, a first group of optical fibers and a second group of optical fibers displaced between a pair of electrode rods are mutually fusion-spliced by the influence of the arc discharge generated between the pair of electrode rods. In such a conventional fusion splicer, optical fibers disposed close to the electrode rods are more easily influenced by the arc discharge. In other words, optical fibers outwardly disposed, that is, in positions close to the electrode rods in the direction in which the optical fibers are arrayed are more greatly influenced by the arc discharge than optical fibers disposed on an inner side, that is, in a position away from the electrode rods in the direction in which the optical fibers are arrayed. In contrast, the fusion splicer according to the embodiment described above includes the first shield displaced between the first and second plurality of V-grooves and the first electrode rod in the first direction along the center line connecting the first tip of the first electrode rod to the second tip of the second electrode rod. The shield can mitigate the influence of the arc discharge against the outermost optical fiber as well as the optical fibers outwardly disposed in the direction in which the optical fibers are arrayed. Accordingly, variation in fusion states of fusion-spliced optical fibers among the optical fibers in the direction in which the optical fibers are arrayed can be small by this fusion splicer.

In one embodiment, the first shield may include a columnar rod extending along a second direction along which the first V-grooves extends. The second direction can intersect with the first direction. In this embodiment, the columnar rod of the first shield may be a cylindrical rod having a diameter equal to or larger than a diameter of each fiber of the first group of the optical fibers. When the first shield and the optical fibers are formed to be of the same columnar shapes, such configuration allows the first shield to be positioned in a manner similar to a manner in which the optical fibers are positioned. When the first shield is of the columnar shape having the same diameter as the diameter of each of the optical fibers, such configuration allows designing for displacing the first shield to be easily made. When the first shield is of the columnar shape having the diameter larger than the diameter of each of the optical fibers, shielding effect by the first shield against the arc discharge becomes large.

In one embodiment, the fusion splicer may further comprise a second shield located between the first and second plurality of V-grooves and the second electrode rod in the first direction. The second shield may be formed of an insulating material having heat resisting properties withstanding 1000 or more degrees Celsius, and the second shield may include a columnar rod extending along the second direction. According to this embodiment, variation in fusion states of fusion-spliced optical fibers among the optical fibers in the direction in which the optical fibers are arrayed can be small on both sides.

In one embodiment, at least one of the first shield and the second shield is made of a ceramic material. In this embodiment, the ceramics material may include zirconia, sapphire, or alumina.

In one embodiment, the first fiber holding part may include a first V-groove configured to support the first shield. The first V-grooves may be located next to an outermost V-groove of the first plurality of V-grooves and extend along an extending direction of the outermost V-groove.

In one embodiment, the first shield may be located on a straight line connecting an outermost V-groove of the first plurality of V-grooves and the first tip of the first electrode rod when viewed from an axial direction of the first group of optical fibers. In this configuration, the first shield is disposed on a shortest path between the first electrode rod and the outermost fiber. Thus, the influence of the arc discharge against the outermost fiber can be more easily mitigated. In another embodiment, the first shield may be located off a straight line connecting an outermost V-groove of the first plurality of V-grooves and the first tip of the first electrode rod when viewed from an axial direction of the first group of optical fibers.

In one embodiment, the fusion splicer may comprise a first electrode holding part configured to hold the first electrode rod, and a second electrode holding part configured to hold the second electrode rod. The first electrode holding part and the second electrode holding part may hold the first and second electrode rods such that the first tip faces the second tip, and a distance between the first tip and the second tip remains unchanged. This embodiment can simplify a configuration of the fusion splicer because the first and second electrode rods do not need to move along the center line for adjustment.

A method for fusion-splicing optical fibers according to one embodiment of the present disclosure relates to a method for fusion-splicing mutually a first group of optical fibers and a second group of optical fibers by arc discharge generated between first and second electrode rods. The first group of optical fibers and the second group of optical fibers are arrayed such that an end of each fiber of the first group of optical fibers abuts on an end of each fiber of the second group of optical fibers. The method comprises a step of locating the first group of optical fibers, the second group of optical fibers, and a shield formed of an insulating material between the first and second electrode rods such that at least part of the shield is included in a predetermined area when viewed from an axial direction of the first group of optical fibers; and a step of generating the arc discharge between the first and second electrode rods to fusion-splicing mutually the first group of optical fibers and a second group of optical fibers, respectively, while maintaining the step of the locating. In this method, the shield is a columnar body and has heat resisting properties withstanding 1000 or more degrees Celsius. The columnar body extends along the axial direction of the first group of optical fibers. The predetermined area is an area delimited by a first border line and a second border line when viewed from the axial direction. The first border line is a tangent line of an outermost fiber of the first group of optical fibers arrayed close to the first electrode rod in a first direction along a center line connecting both tips of the first and second electrode rods each other. The tangent line is orthogonal to the center line and is formed on an inner side of the outermost fiber in a fiber-arrayed direction. The second border line is a perpendicular line to the center line and passes the tip of the first electrode rod.

In the above method, the shield is located such that at least part of the shield is included in the predetermined area delimited by the first border line and the second border line. The first border line is the tangent line of the outermost fiber of the first group of optical fibers arrayed close to the first electrode rod, and the tangent line is orthogonal to the center line and formed on an inner side of the outermost fiber. The second border line is a perpendicular line to the center line and passes the tip of the first electrode rod. That is, the shield is displaced between the first and second groups of optical fibers and the first electrode rod in the first direction along the center line in generating the arc discharge in this method. The shield can mitigate the influence of the arc discharge against the outermost optical fiber as well as the optical fibers outwardly disposed in the direction in which the optical fibers are arrayed. Accordingly, variation in fusion states of fusion-spliced optical fibers among the optical fibers in the direction in which the optical fibers are arrayed can be small by this method.

In one example of the method, the predetermined area may be an area enclosed by the first border line, the second border line, a third border line, and a fourth border line when viewed from the axial direction. The third border line may be the center line, and the fourth border line may be another tangent line of the outermost fiber. The fourth border line may be parallel to the center line and be further away from the center line. In this configuration, the shield can be more appropriately displaced in a direction crossing the center line.

In one embodiment of the method, the predetermined area may be an area enclosed by the first border line, the second border line, a third border line, and a fourth border line when viewed from the axial direction. The third border line may be one tangent line of the outermost fiber, and the fourth border line may be another tangent line of the outermost fiber. Both of the tangent line and the another tangent line can be in parallel to the center line. In this configuration, the outermost optical fiber and the shield can partially overlap with each other in the direction crossing the center line. Thus, the influence of the arc discharge against the outermost fiber is more easily mitigated.

In one embodiment of the method, at least a part of the shield may be located on a straight line connecting the tip of the first electrode rod to the outermost fiber when viewed from the axial direction. In this method, the shield is disposed on the shortest path between the electrode rods and the outermost fiber. Thus, the influence of the arc discharge against the outermost fiber is more easily mitigated.

In one embodiment of the method, the shield may include a columnar rod. The shield and the optical fibers are formed to be of the same columnar shapes, thereby allowing the shield to be positioned in a manner similar to a manner in which the optical fibers are positioned.

In one embodiment of the method, the columnar rod of the shield may be a cylindrical rod having a diameter equal to or larger than a diameter of each fiber of the first group of the optical fibers. When the shield is of the columnar shape having the same diameter as the diameter of each of the optical fibers, such method allows designing for displacing the shield to be easily made. When the shield is of the columnar shape having the diameter larger than the diameter of each of the optical fibers, shielding effect against the arc discharge becomes large.

Details of the Embodiments of the Present Disclosure

Specific examples of a fusion splicer and a method for fusion-splicing optical fibers according to the present disclosure will be described in detail with reference to the accompanying drawings below. The present invention is not limited to these examples but is indicated by the appended claims, and it is intended that all modifications coining within the meaning of equivalency range of the appended claims are embraced within their scope. In the description of the drawings, the same components are denoted by the same reference numerals and signs and overlapped description is omitted. In the description, an XYZ orthogonal coordinate system illustrated in each of the drawings may be referenced.

Figure 1:
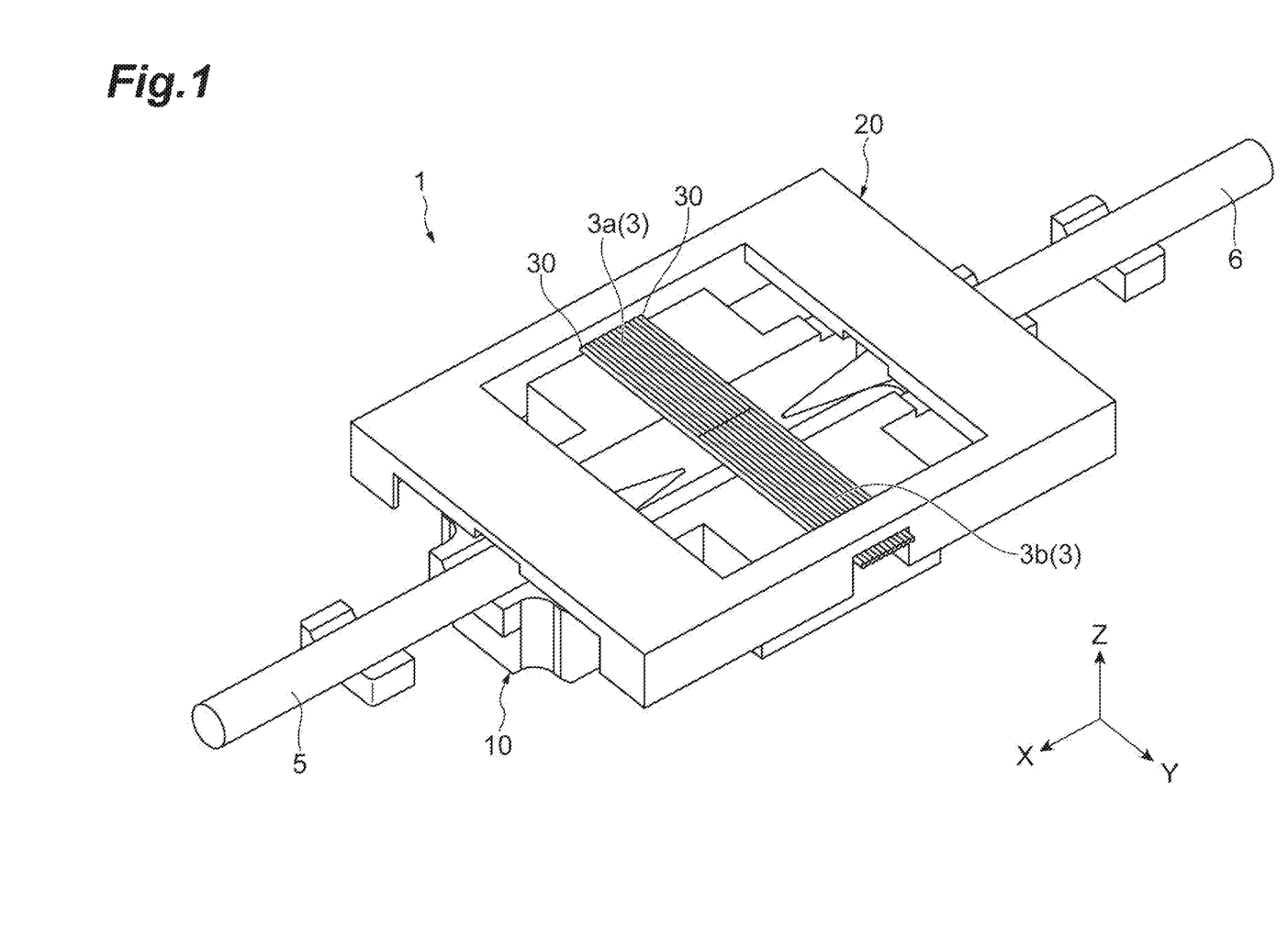
FIG. 1 is a perspective view illustrating an optical fiber fusion splicer according to one example.

FIG. 1 is a perspective view illustrating an optical fiber fusion splicer 1. The fusion splicer 1 is an apparatus which fusion-splices mutually a first group of optical fibers 3a and a second group of optical fibers 3b arrayed such that end of each fiber of the first group of optical fibers 3a abuts on end of each fiber of the second group of optical fibers 3b, by arc discharge. Each optical fiber 3 of the optical fibers 3a and 3b can be glass fibers. The first group of optical fibers 3a and the second group of optical fibers 3b are arrayed between a pair of electrode rods 5 and 6. The pair of electrodes 5 and 6 are configured to generate arc discharge. As illustrated in FIG. 1, the fusion splicer 1 includes a main body 10 and an attachment 20 (adapter). For example, in a field site where an optical communication network is constructed, the fusion splicer 1 fusion-splices mutually an end of each fiber of the first group of optical fibers 3a which constitute a multicore optical fiber cable, and an end of each fiber of the second group of optical fibers 3b which are held by a ferrule of a multicore optical connector. Each of the optical fibers 3a and each of the optical fibers 3b have fiber (glass) diameters which are the same as each other, and as one example, each of the fiber (glass) diameters may be 125 μm.

Figure 2:
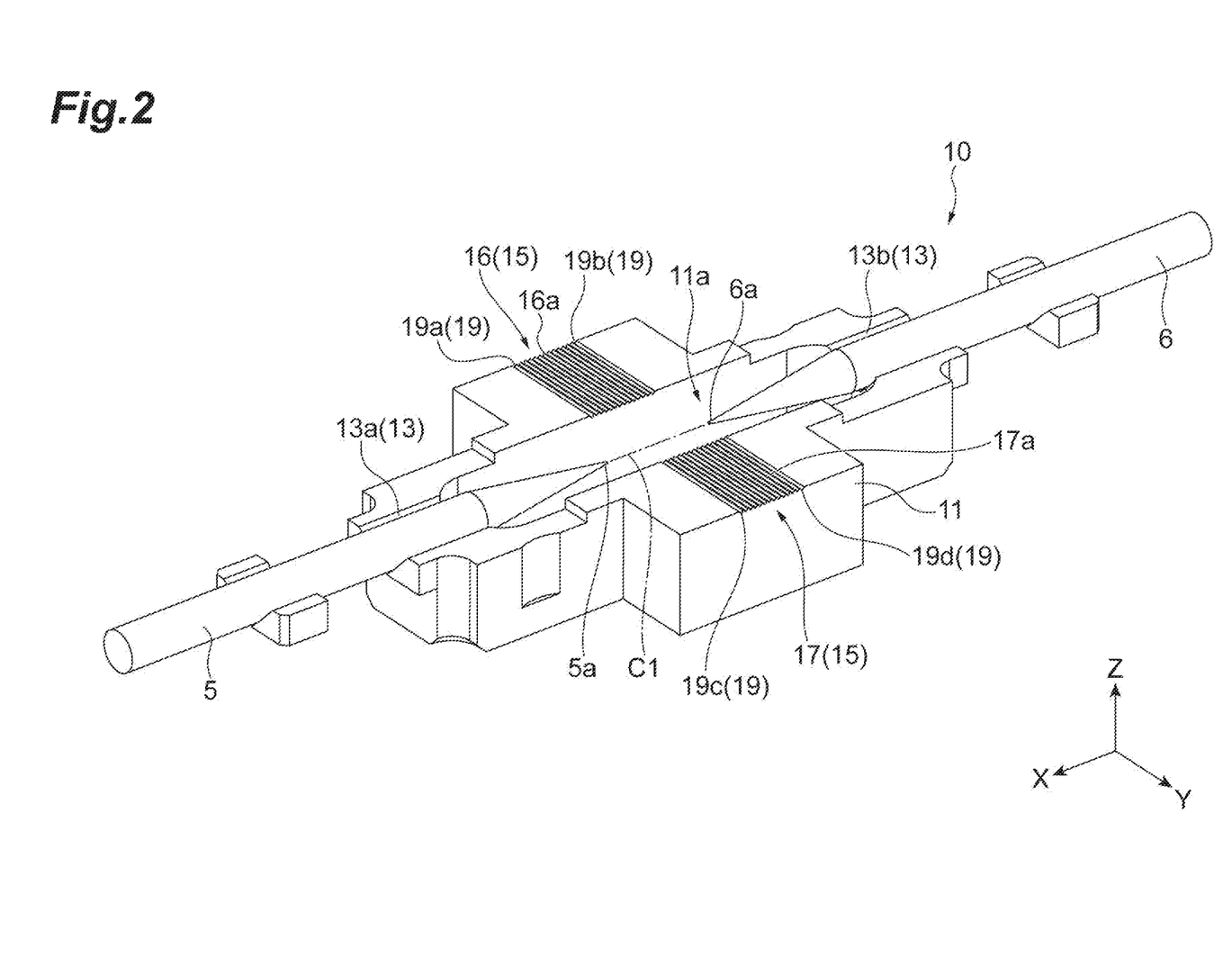
FIG. 2 is a perspective view illustrating a main body of the optical fiber fusion splicer according to the example.
Figure 3:
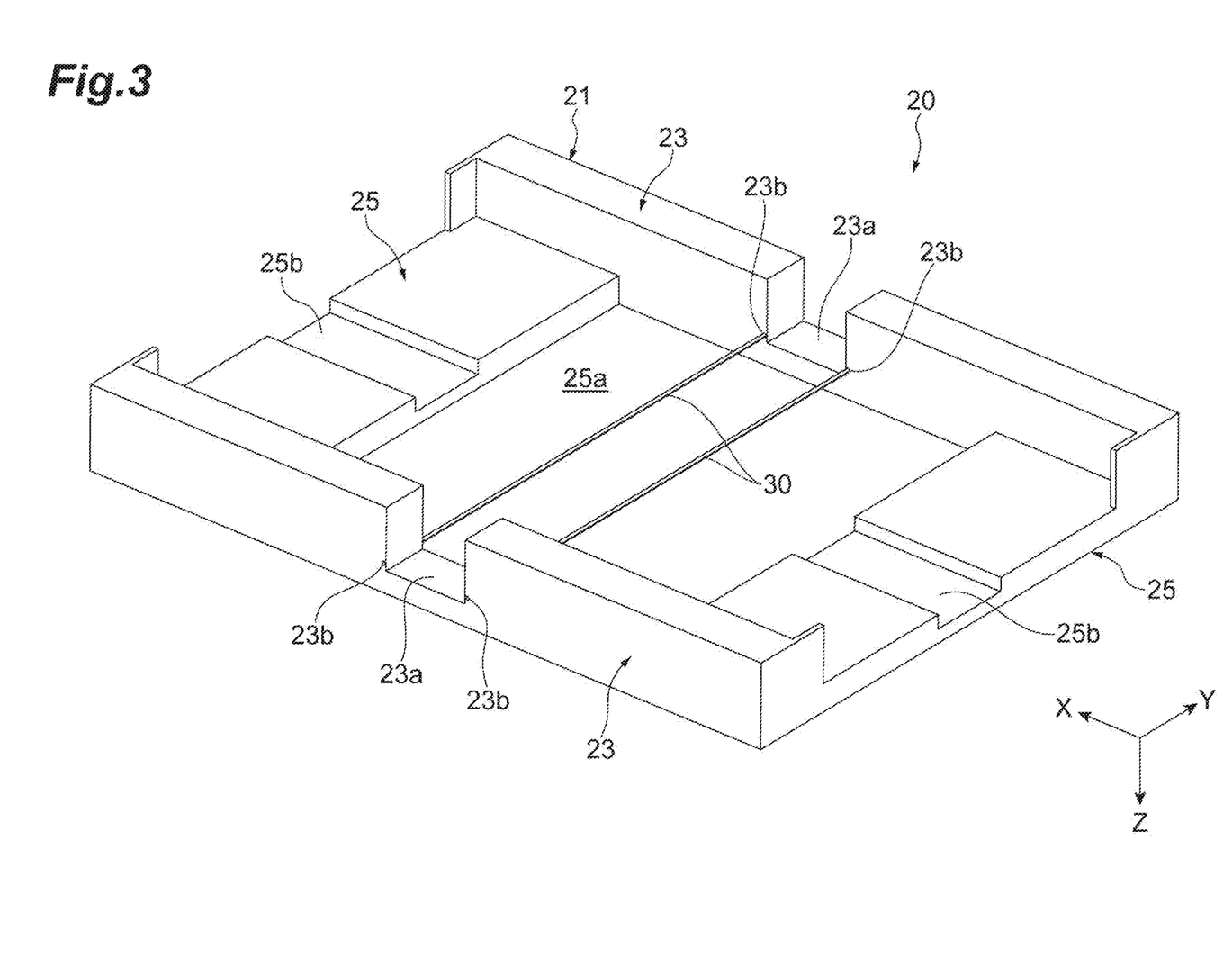
FIG. 3 is a perspective view illustrating an attachment of the optical fiber fusion splicer according to the example.

FIG. 2 is a perspective view illustrating the main body 10 included in the fusion splicer 1. FIG. 3 is a perspective view illustrating the attachment 20 included in the fusion splicer 1. FIG. 3 illustrates a perspective view of the attachment 20 viewed from a lower surface. The main body 10 includes the pair of electrode rods 5 and 6, and a base 11. The pair of electrode rods 5 and 6 are disposed to be spaced away from each other on the base 11. The electrode rod 5 and the electrode rod 6 are disposed such that a tip 5a and a tip 6a face each other. In the example illustrated therein, each of the electrode rods 5 and 6 has a substantially conical portion whose diameter decreases in accordance with an increase in proximity to each of the tips 5a and 6a, respectively.

The base 11 includes an electrode holding part 13, an optical fiber holding part 15 and a shield holding part 19. As one example, the base 11 may be made of zirconia. The electrode holding part 13 is a pair of portions where the pair of electrode rods 5 and 6 are disposed, respectively. The electrode holding part 13 has contacting surfaces 13a and 13b which correspond to the pair of electrode rods 5 and 6, respectively. Each of the contacting surfaces 13a and 13b is formed by two planes to have a substantially V-shaped cross section. The electrode rod 5 contacts the contacting surface 13a, whereby a position of the electrode rod 5 in a Y direction and a Z direction is determined. The electrode rod 6 contacts the contacting surface 13b, whereby a position of the electrode rod 6 in the Y direction and the Z direction is determined. Positions of the electrode rods 5 and 6 in an X direction can be adjusted with the electrode rods 5 and 6 contacting the contacting surfaces 13a and 13b, respectively. The positioned electrode rods 5 and 6 can be fixed to the electrode holding part 13 by fixing members, not illustrated, thereby a distance between the tip 5a and the tip 6a remains unchanged. In the example illustrated therein, an opening 11a which passes through the base 11 in the Z direction is formed between the contacting surface 13a and 13b in the X direction. The tips 5a and 6a of the pair of electrode rods 5 and 6 face each other inside the opening 11a.

The optical fiber holding part 15 is located between the pair of electrode rods 5 and 6 in the X direction. The optical fiber holding part 15 illustrated therein has a first fiber holding part 16 and a second fiber holding part 17, respectively. In the Y direction, the first fiber holding part 16 is located on one side with respect to a center line C1 extending between the tips 5a and 6a of the pair of electrode rods 5 and 6, and the second fiber holding part 17 is located on another side with respect to the center line C1. The first fiber holding part 16 and the second fiber holding part 17 are spaced apart from each other in the Y direction. The first fiber holding part 16 has a plurality of V-grooves 16a for respectively holding the plurality of optical fibers 3a. In this example, the optical fibers 3a include 12 optical fibers. The V-grooves 16a are disposed at equal intervals in the X direction and are formed in a linear manner along the Y direction. Similarly, the second fiber holding part 17 has a plurality of V-grooves 17a for respectively disposing the plurality of optical fibers 3b. In this example, the optical fibers 3b include 12 optical fibers. The V-grooves 17a are disposed at equal intervals in the X direction and are formed in a linear manner along the Y direction. The V-grooves 16a of the first fiber holding part 16 position the first group of the optical fibers 3a, and the V-grooves 17a of the second fiber holding part 17 position the second group of optical fibers 3b. In the example illustrated therein, each of the plurality of V-grooves 16a and each of the plurality of V-grooves 17a face each other, respectively. Thus, each of the optical fibers 3a positioned by the V-grooves 16a can abut on each of the optical fibers 3b positioned by the V-grooves 17a between the first fiber holding part 16 and the second fiber holding part 17. The area between the first fiber holding part 16 and the second fiber holding part 17 is located in the opening 11a of the base 11.

The shield holding part 19 includes four portions for locating (housing) a pair of shields 30. Each of the shields 30 is a columnar body (cylindrical body in one example) (see FIG. 3) and is formed of an insulating material having heat resisting properties withstanding 1000 or more degrees Celsius. Each of the shields 30 may have a diameter of, for example, approximately 100 μm to 500 μm. In the present embodiment, a diameter of each of the shields 30 is 125 μm which is the same as a fiber (glass) diameter of each of the optical fibers 3a and 3b. The shields 30 can be made of ceramic, such as zirconia, sapphire, and alumina. The shield holding part 19 is provided in each area between the optical fiber holding part 15 and each of the electrode rods 5 and 6, respectively in a direction (that is, the X direction) along the center line C1. The shield holding part 19 includes a pair of V-grooves 19a and 19b, and a pair of V-grooves 19c and 19d. The pair of V-grooves 19a and 19b are formed in positions sandwiching the plurality of V-grooves 16a constituting the first fiber holding part 16 therebetween. The pair of V-grooves 19c and 19d are formed in positions sandwiching the plurality of V-grooves 17a constituting the second fiber holding part 17 therebetween. The V-grooves 19a to 19d are formed on an upper surface of the base 11 and extends along the Y direction, which is a direction in which the V-grooves 16a and 17a extend. A distance (pitch) between the V-grooves 16a which neighbor to each other respectively in the first fiber holding part 16 and a distance between a V-groove 16a located in an outermost end in the X direction in the first fiber holding part 16 and the V-groove 19a (19b) of the shield holding part 19 may be the same as each other. Similarly, a distance between the V-grooves 17a which neighbor to each other respectively in the second fiber holding part 17 and a distance between a V-groove 17a in an outermost end in the X direction in the second fiber holding part 17 and the V-grooves 19c (19d) of the shield holding part 19 may be the same as each other.

The attachment 20 serves to locate the pair of shields 30 in the shield holding part 19. The attachment 20 has a frame 21 and the pair of shields 30 fixed to the frame 21. The frame 21 includes a pair of side plates 23, and a pair of upper plates 25 which connects the pair of side plates 23. The pair of upper plates 25 are disposed to be spaced apart from each other. An opening 25a is formed between the upper plates 25. A pair of grooves 25b which extend in the X direction are formed on lower surfaces of the upper plates 25, in positions which correspond to the electrode rods 5 and 6, respectively. A pair of grooves 23a which extend in central portions in the X direction from lower ends toward upper sides are formed in the side plates 23. The grooves 23a illustrated therein have rectangular-shaped cross section. The grooves 23a function as gates through which the optical fibers 3a and 3b pass.

Figure 4:
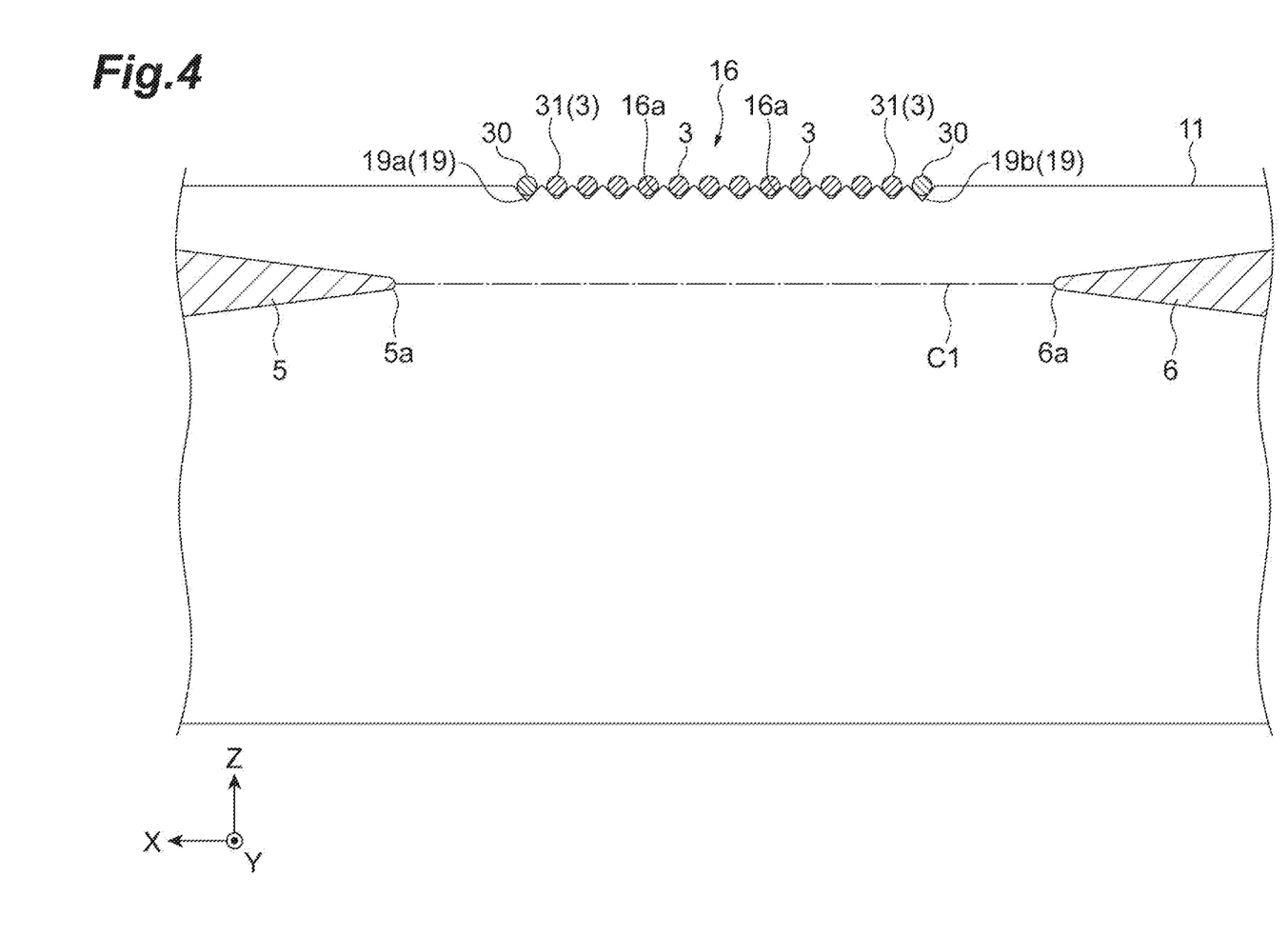
FIG. 4 is an enlarged cross-sectional view of the optical fiber fusion splicer.

The pair of shields 30 are laid between the pair of side plates 23. The pair of shields 30 are fixed in positions which sandwich the grooves 23a formed in the side plates 23. In the example illustrated therein, end portions of the shields 30 are fixed to be inserted into fixing holes 23b formed in the side plates 23. The fixing holes 23b are formed in each of the side plates 23 in a paired manner, respectively. FIG. 4 is an enlarged cross-sectional view of the optical fiber fusion splicer.

FIG. 4 is a diagram explaining a state in which the attachment 20 is set in the main body 10. FIG. 4 is a cross-sectional view of the first fiber holding part 16 along an XZ-plane including the center line C1 and the illustration of the attachment 20 is omitted. FIG. 4 illustrates a state in which the optical fibers 3 (3a) are disposed in the first fiber holding part 16 and the shields 30 are disposed in the shield holding part 19. Since disposition relationship of the optical fibers 3 and the shields 30 in the second fiber holding part 17 is the same as disposition relationship in the first fiber holding part 16, the description therefor is omitted.

As illustrated in FIG. 4, the optical fibers 3 and the shields 30 are located between the pair of electrode rods 5 and 6. The optical fibers 3 are disposed to be spaced away from each other in the X direction. Respective pitches between the optical fibers 3 neighboring to each other are equal to one another. As one example, the plurality of optical fibers 3 are disposed to have respective pitches, each of which is 250 μm corresponding to double of the glass fiber diameter. In addition, a position where the optical fibers 3 are arrayed is shifted from the center line C1 between the electrode rods 5 and 6 in the Y direction. Each of the shields 30 is provided in each area between the first fiber holding part 16 and each of the electrode rods 5 and 6 in the X direction. In other words, the shields 30 are provided in an area between outermost optical fibers 31 and the electrode rods 5 and 6, respectively. Each of the outermost optical fibers 31 is one optical fiber 3 arrayed in an outermost end in X direction along the center line C1.

Figure 5:
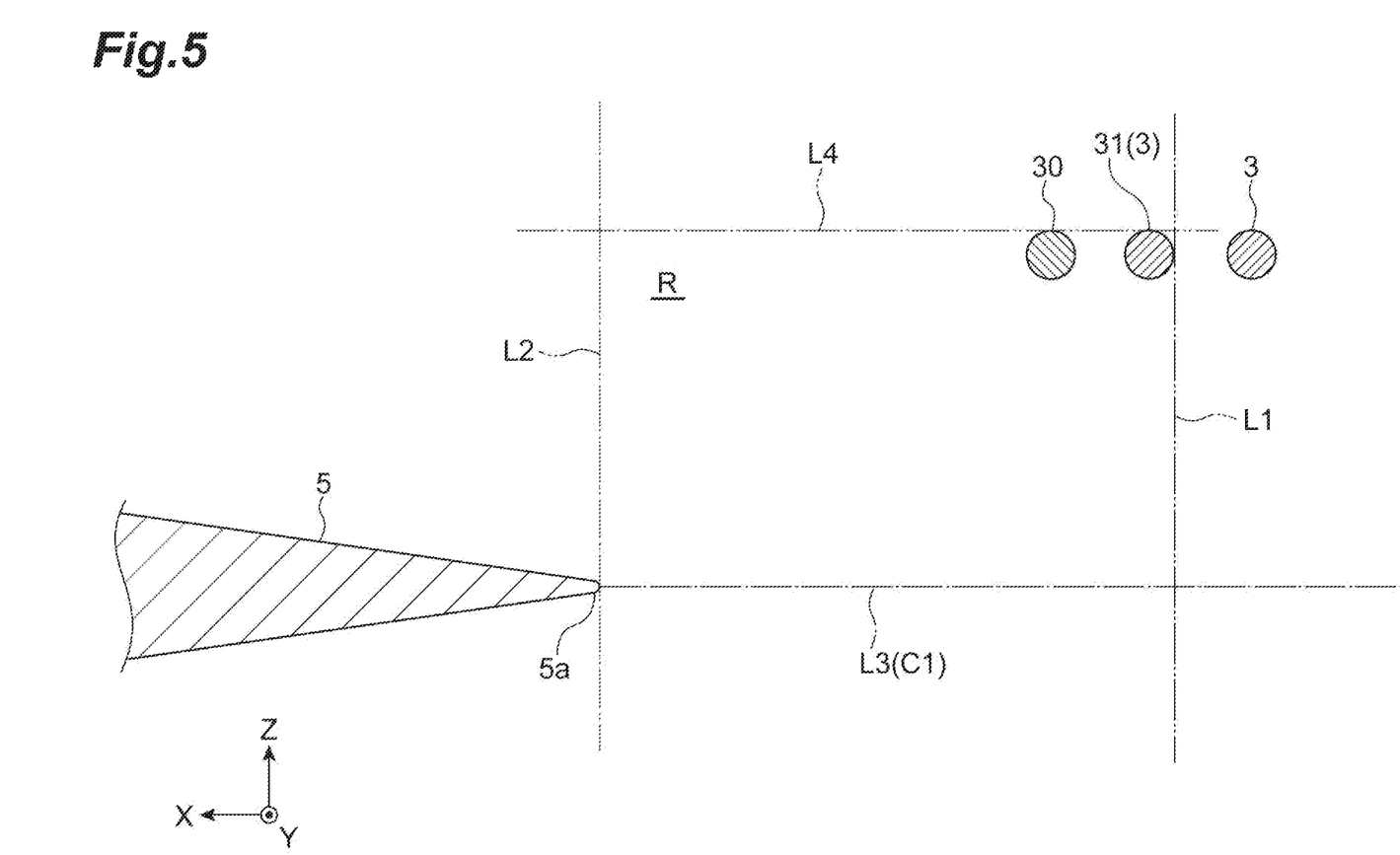
FIG. 5 is a diagram for explaining displacement of an electrode rod, a shield, and optical fibers.

FIG. 5 is a diagram for explaining disposition of the electrode rod, the shield, and the optical fibers. In FIG. 5, disposition relationship of the shield 30 and the optical fibers 3 close to the electrode rod 5 is illustrated. Since disposition relationship of the shield 30 and the optical fibers 3 close to the electrode rod 6 is similar to the disposition relationship on the side of the electrode rod 5, the description therefor is omitted. As illustrated in FIG. 5, when the shield 30 is viewed from an axial direction of the optical fibers 3 (Y direction), at least one part of the shield 30 is disposed be included in a predetermined area R. In an example in FIG. 5, whole area of the shield 30 is disposed inside the predetermined area R. The predetermined area R may be an area enclosed by a first border line L1, a second border line L2, a third border line L3, and a fourth border line L4.

The first border line L1 is a tangent line of the outermost optical fiber 31, and this tangent line is orthogonal to the center line C1 and is formed on an inner side of the outermost optical fiber 31 in a fiber-arrayed direction (the X direction). The second border line L2 is a perpendicular line to the center line C1 on the XZ-plane and passes the tip 5a of the electrode rod 5, provided toward the outermost optical fiber 31, of the pair of electrode rods 5 and 6. As described above, the shield 30 is disposed between the electrode rod 5 and the outermost optical fiber 31 in the X direction. For example, a distance from the electrode rod 5 to the outermost optical fiber 31 in the X direction may be approximately 1 mm.

The third border line L3 may be the center line C1. As illustrated therein, when the optical fibers 3 are disposed above the center line C1, the shield 30 may be disposed above the center line C1. The fourth border line L4 may be a tangent line of the outermost optical fiber 31, and this tangent line is further away from the center line C1 and is parallel to the center line C1.

Figure 6:
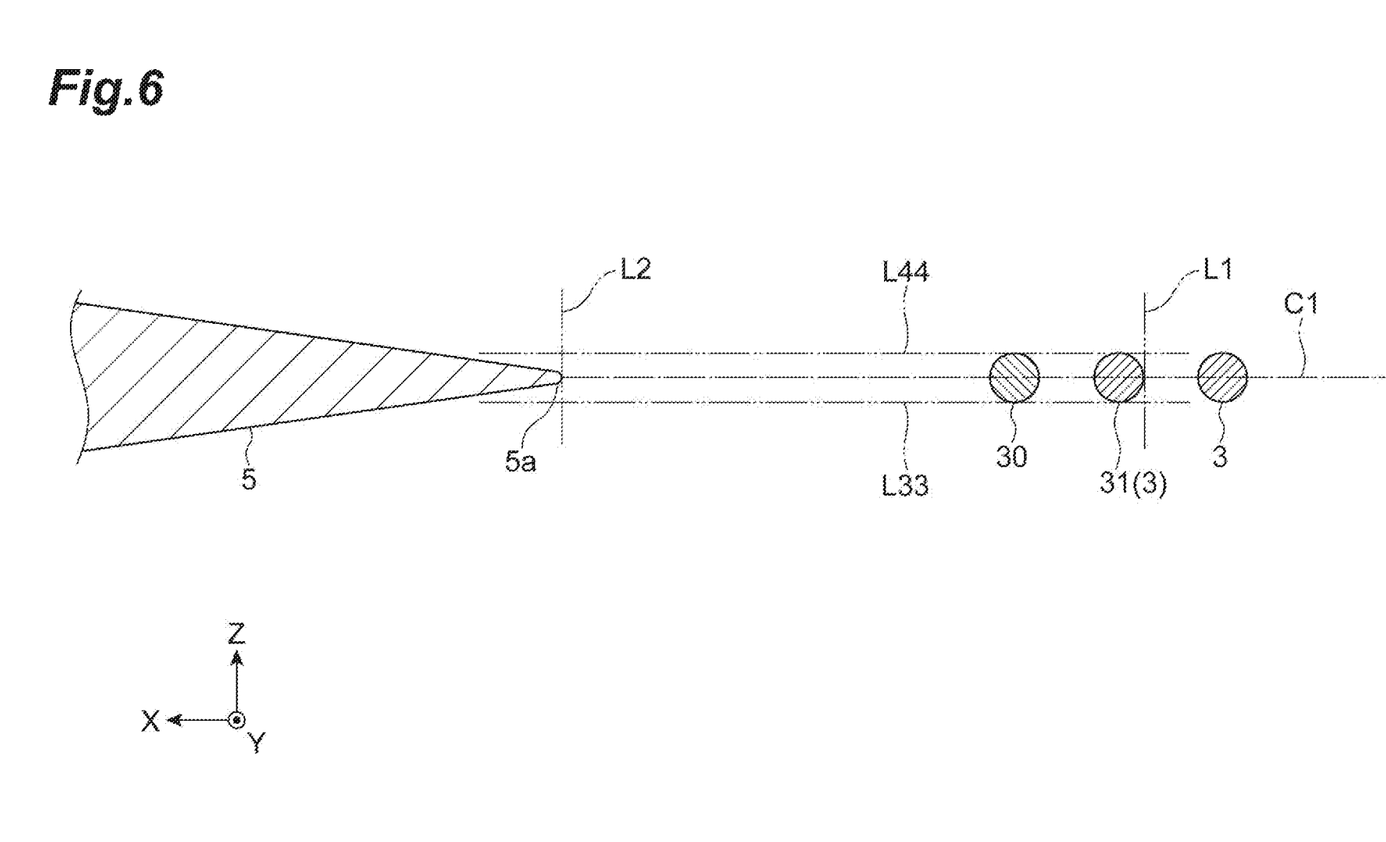
FIG. 6 is a diagram for explaining displacement of the electrode rod, the shield, and the optical fibers.

When the optical fibers 3 are disposed on the center line C1, the above-described predetermined area R can be identified by a different definition. FIG. 6 is a diagram for explaining that the electrode rod, the shield, and the optical fibers are disposed when the optical fibers are disposed on the center line. In an example illustrated in FIG. 6, a predetermined area R is an area enclosed by the first border line L1, the second border line L2, a third border line L33, and a fourth border line L44. The first border line L1 and the second border line L2 are the same as those in the example illustrated in FIG. 5. When the optical fibers 3 are disposed on the center line C1, the third border line L33 may be one tangent line of parallel tangent lines of the outermost optical fiber 31, and the fourth border line L44 may be another tangent line of the parallel tangent lines of the outermost optical fiber 31. The above parallel tangent lines are parallel to the center line C1.

The fusion splicer 1 fusion-splices the first group of optical fibers 3a and the second group of the optical fibers 3b by employing the below-described method. First, the first group of optical fibers 3a are housed in the V-grooves 16a and the second group of optical fibers 3b are housed in the V-grooves 17a. Next, an end of each of the optical fibers 3a housed in the V-grooves 16a and an end of each of the optical fibers 3b housed in the V-grooves 17a are abutted on each other in the opening 11a. Next, the attachment 20 is attached to the main body 10 and then the shields 30 are disposed in the V-grooves 19a to 19d of the shielding member disposition part 19. Thus, the optical fibers 3a and 3b, and the shields 30 are located between the pair of electrode rods 5 and 6 such that at least part of each of the shields 30 is included in the predetermined area R, viewed from the axial direction of each of the optical fibers 3. The arc discharge is performed by the pair of electrode rods 5 and 6 against a portion where the ends of the optical fibers 3a and 3b are abutted on each other. Thus, the first group of optician fiber 3a and the second group of optical fiber 3b are mutually fusion-spliced.

In the fusion splicer 1 described above, the plurality of optical fibers 3a and 3b disposed between the pair of electrode rods 5 and 6 are mutually fusion-spliced by the arc discharge generated between the pair of electrode rods 5 and 6. In the conventional fusion-splicing method, optical fibers which are disposed in positions close to the electrode rods are more easily influenced by the arc discharge. In other words, the optical fibers which are outwardly disposed (in positions close to the electrode rods) in the direction in which the optical fibers are arrayed are more greatly influenced by the arc discharge than the optical fibers which are inwardly disposed (in a position remote from the electrode rods) in the direction in which the optical fibers are arrayed. Thus, fusion states easily vary between the optical fibers inwardly disposed in the direction in which the optical fibers are arrayed and the optical fibers outwardly disposed. In contrast, this embodiment disposes the shields 30 in the predetermined area R delimited by the first border line L1 and the second border line L2. In other words, each of the shields 30 is disposed in the area between each of the electrode rods 5 and 6 and each of the outermost optical fibers 31, respectively. The shields 30 disposed as described above mitigate the influence of the arc discharge against the outermost optical fibers 31 as well as the optical fibers 3 outwardly disposed in the direction in which the optical fibers are arrayed. Accordingly, the variation in the fusion states among the optical fibers 3 in the direction in which the optical fibers are arrayed is suppressed.

As illustrated in FIG. 5, the predetermined area R may be the area enclosed by the first border line L1, the second border line L2, the third border line L3, and the fourth border line L4, when viewed from the axial direction of the optical fibers 3. In this configuration, each of the shields 30 can be disposed in a more appropriate position in the direction crossing the center line C1. Thus, large deviation of the shields 30 from a path of the arc discharge in the Z direction is suppressed.

As illustrated in FIG. 6, the predetermined area R may be the area enclosed by the first border line L1, the second border line L2, the third border line L33, and the fourth border line L44 when viewed from the axial direction of the optical fibers 3. In this configuration, each of the outermost optical fibers 31 and each of the shields 30 at least partially overlap with each other in the direction (Z direction) crossing the direction in which the center line C1 extends. Thus, each of the shields 30 enters part of the path of the arc discharge, and the influence of the arc discharge against the outermost optical fibers 31 is more easily mitigated.

The shields 30 and the optical fibers 3 are formed to be of the same columnar shapes, thereby allowing the shields 30 to be positioned in a manner similar to a manner in which the optical fibers 3 are positioned. In the above-described embodiment, the diameter of each of the shields 30 and the diameter of each of the optical fibers 3 are the same as each other. The V-grooves 16a and 17a of the optical fiber holding part 15 and the V-grooves 19a to 19d of the shield holding part 19 can be formed in manners similar to each other.

Hereinbefore, one embodiment of this disclosure is described in detail with reference to the accompanying drawings. However, the specific configuration is not limited to this embodiment.

For example, the positions of the shields 30 relative to the electrode rods 5 and 6 and the optical fibers 3 are not limited to those in the above-described embodiment. The shape of each of the shields 30 is not limited to that in the above-described embodiment. FIG. 7 to FIG. 11 are diagrams illustrating other examples of displacement of the electrode rods, the shields, and the optical fibers. In FIG. 7 to FIG. 11, the optical fibers and the electrode rods are similar to those in the above-described embodiment.

Figure 7:
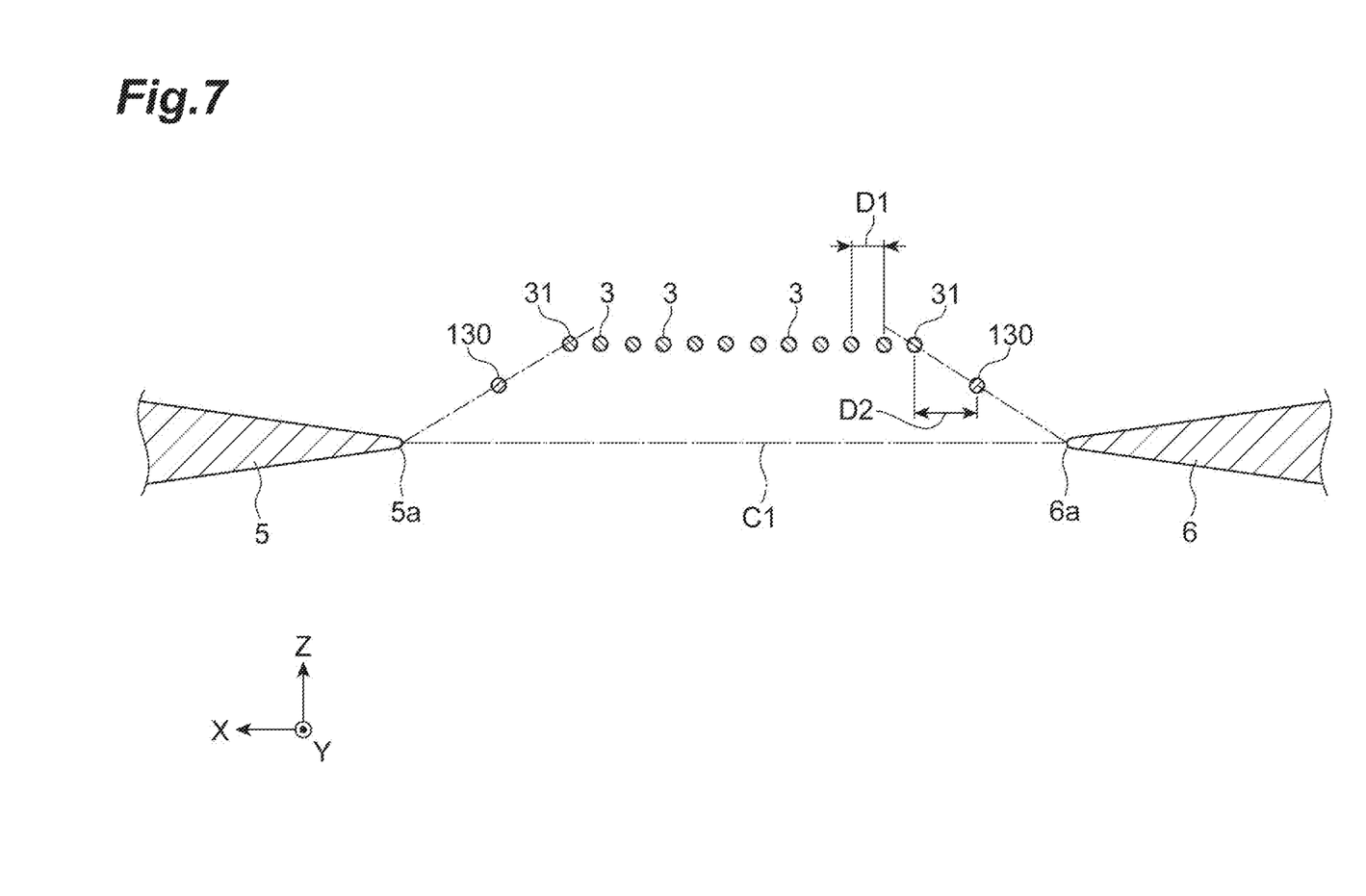
FIG. 7 is a diagram illustrating one example of displacement of the electrode rods, the shields, and the optical fibers.

The shields may be disposed, for example, as illustrated in FIG. 7. Each of shields 130 illustrated in FIG. 7 is of a columnar shape having the same diameter as that of each of the optical fibers 3, as in the above-described embodiment. In this example, at least part of each of the shields 130 is laid on a straight line connecting each of the outermost optical fibers 31 and each of the tips 5a and 6a of the electrode rods 5 and 6, when viewed from the axial direction of the optical fibers 3. As one example, a center of each of the shields 130 is laid on the straight line connecting each of the outermost optical fibers 31 and each of the tips 5a and 6a of the electrode rods 5 and 6. In the example illustrate therein, a distance D2 between each of the outermost optical fibers 31 and each of the shields 30 is larger than a distance (pitch) D1 respectively between the optical fibers 3 which neighbor to each other, in the X direction. As one example, the distance D2 may be approximately three times the distance D1. Since each of the shields 130 is disposed on the shortest path between each of the electrode rods 5 and 6 and each of the outermost optical fibers 31, the influence of the arc discharge against the outermost optical fibers 31 can be more easily mitigated.

Figure 8:
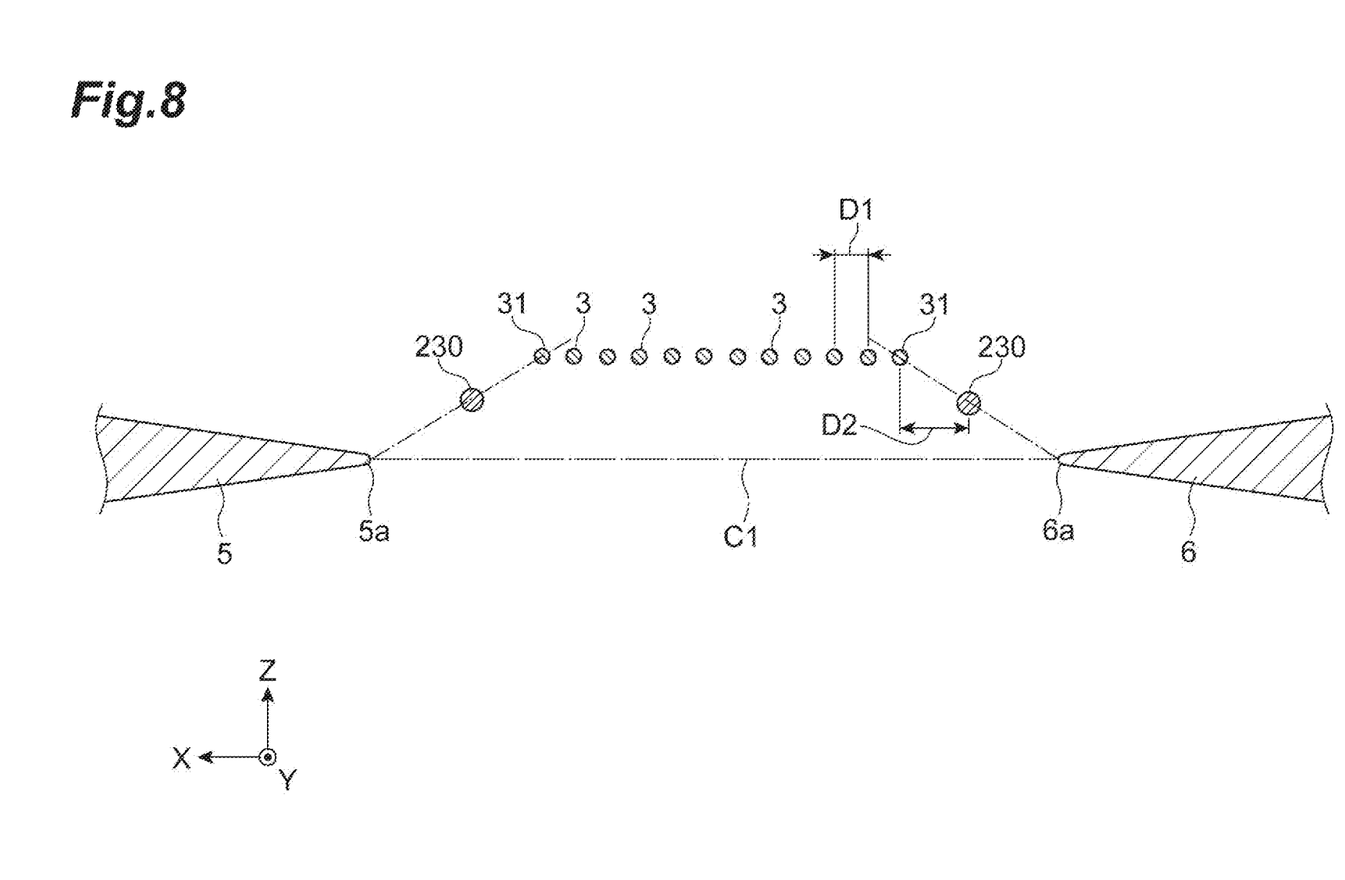
FIG. 8 is a diagram illustrating one example of displacement of the electrode rods, the shields, and the optical fibers.

The shields may be disposed, for example, as illustrated in FIG. 8. Each of shields 230 illustrated in FIG. 8 is of a columnar shape having a diameter larger than that of each of the optical fibers 3. As one example, the diameter of each of the shields 230 may be 250 μm. In this example, at least part of each of the shields 230 is laid on a straight line connecting each of the outermost optical fibers 31 and each of the tips 5a and 6a of the electrode rods 5 and 6, when viewed from the axial direction of the optical fibers 3. As one example, a center of each of the shields 230 is located on the straight line connecting each of the outermost optical fibers 31 and each of the tips 5a and 6a of the electrode rods 5 and 6. In the example illustrated therein, a distance D2 between each of the outermost optical fibers 31 and each of the shields 230 is larger than a distance D1 respectively between the optical fibers 3, in the X direction. As one example, the distance D2 may be approximately three times the distance D1. In the example illustrated in FIG. 8, since the diameter of each of the shields 230 is formed to be larger, shielding effect against the arc discharge becomes larger than that in the example illustrated in FIG. 7.

Figure 9:
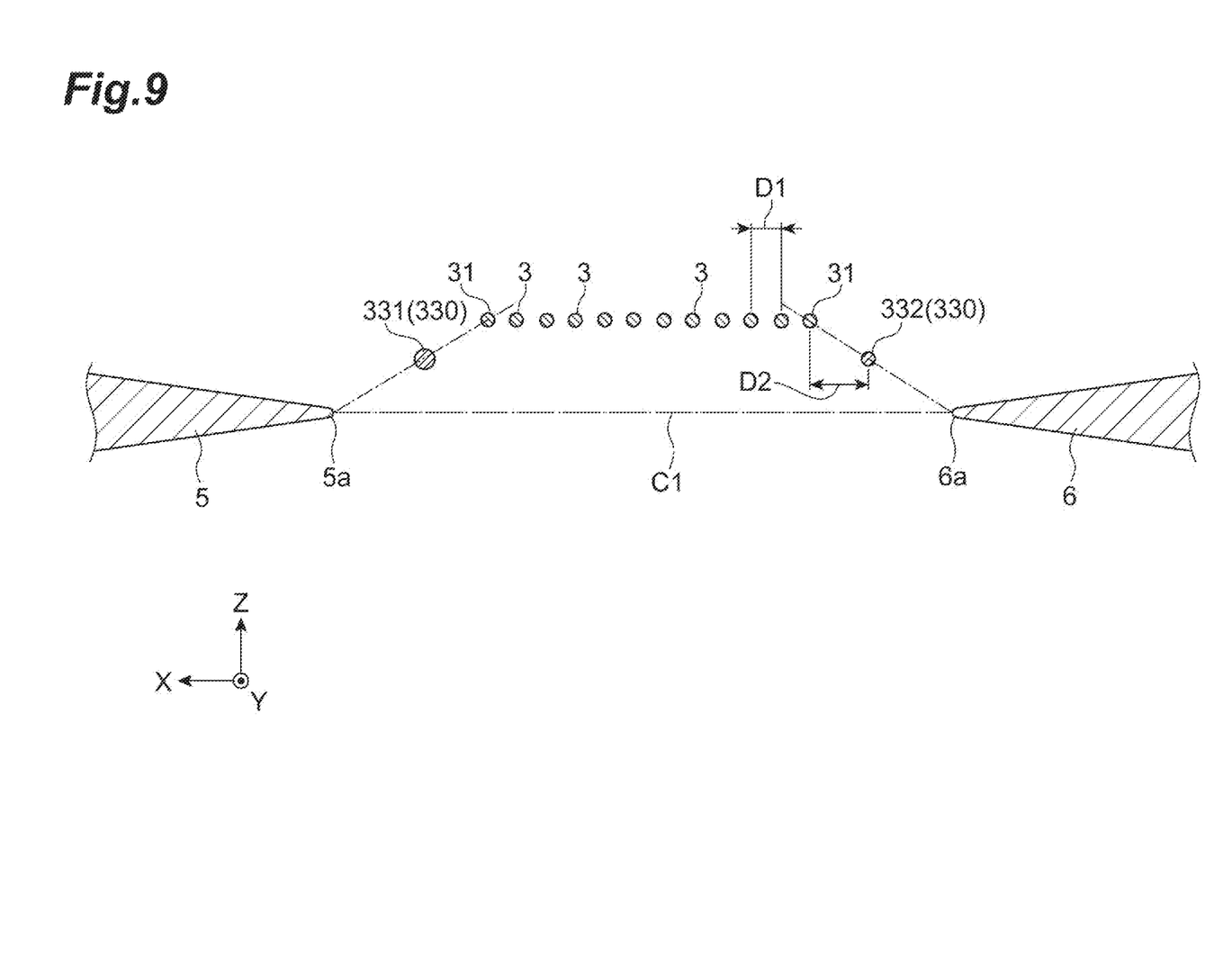
FIG. 9 is a diagram illustrating one example of displacement of the electrode rods, the shields, and the optical fibers.

The shields may be disposed, for example, as illustrated in FIG. 9. As for a pair of shields 330 illustrated in FIG. 9, one shield 331 thereof is of a columnar shape having a diameter larger than that of each of the optical fibers 3 and the other shield 332 thereof has the same diameter as that of each of the optical fibers 3. As one example, the diameter of the shield 331 may be 250 μm. In this example, at least part of each of the shields 330 is laid on a straight line connecting each of the outermost optical fibers 31 and each of the tips 5a and 6a of the electrode rods 5 and 6, when viewed from the axial direction of the optical fibers 3. As one example, a center of each of the shields 330 is located on the straight line connecting each of the outermost optical fibers 31 and each of the tips 5a and 6a of the electrode rods 5 and 6. In the example illustrated therein, a distance D2 between each of the outermost optical fibers 31 and each of the shields 330 is larger than a distance D1 respectively between the optical fibers 3, in the X direction. As one example, the distance D2 may be approximately three times the distance D1. In the example illustrated in FIG. 9, since the diameter of the shield 331 disposed near a cathode is formed to be larger, degrees on right and left sides (an electrode rod 5 and an electrode rod 6) at which the influence of the arc discharge is mitigated can be made different from each other.

Figure 10:
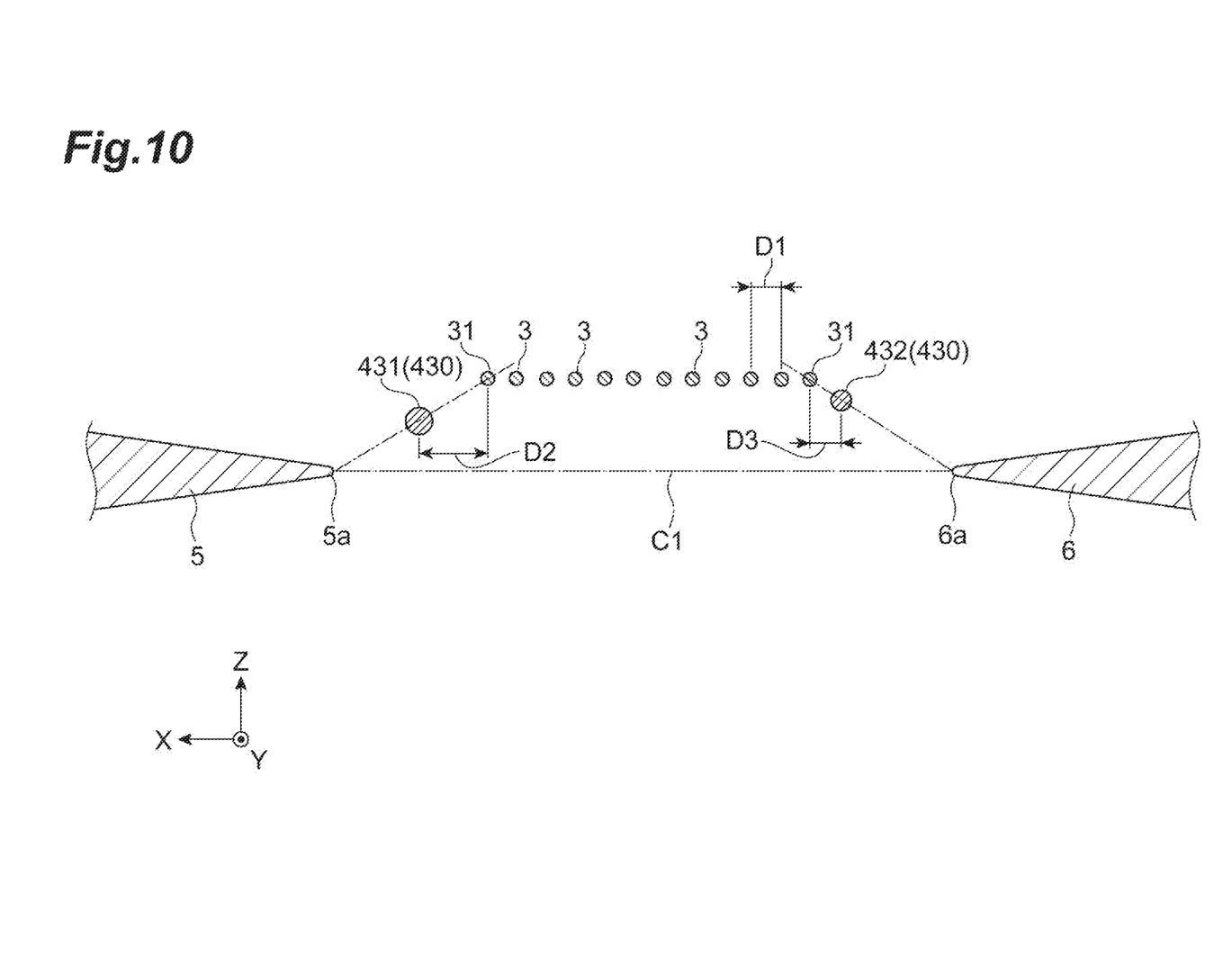
FIG. 10 is a diagram illustrating one example of displacement of the electrode rods, the shields, and the optical fibers.

The shields may be disposed, for example, as illustrated in FIG. 10. As for a pair of shields 430 illustrated in FIG. 10, one shield 431 thereof is of a columnar shape having a diameter larger than that of each of the optical fibers 3 and the other shield 432 thereof has a diameter larger than that of each of the optical fibers 3 and smaller than the diameter of the one shield 431. As one example, the diameter of the shield 431 may be 500 μm and the diameter of the shield 432 may be 250 μm. In this example, at least part of each of the shields 430 is laid on a straight line connecting each of the outermost optical fibers 31 and each of the tips 5a and 6a of the electrode rods 5 and 6, when viewed from the axial direction of the optical fibers 3. As one example, a center of each of the shields 430 is located on the straight line connecting each of the outermost optical fibers 31 and each of the tips 5a and 6a of the electrode rods 5 and 6. In the example illustrated therein, a distance D2 between the outermost optical fiber 31 and the one shield 431 is larger than a distance D1 respectively between the optical fibers 3. As one example, the distance D2 may be approximately three times the distance D1. In addition, a distance D3 between the outermost optical fiber 31 and the other shield 432 may be the same as the distance D1 respectively between the optical fibers 3 or may be smaller than the distance D1. In the example illustrated in FIG. 10, since the diameter of the shield 431 and the diameter of the shield 432 are different from each other and a distance between the one shield 431 and the tip 5a of the electrode rod 5 is smaller than a distance between the other shield 432 and the tip 6a of the electrode rod 6, degrees on right and left sides at which the influence of the arc discharge is mitigated can be made different from each other.

Figure 11:
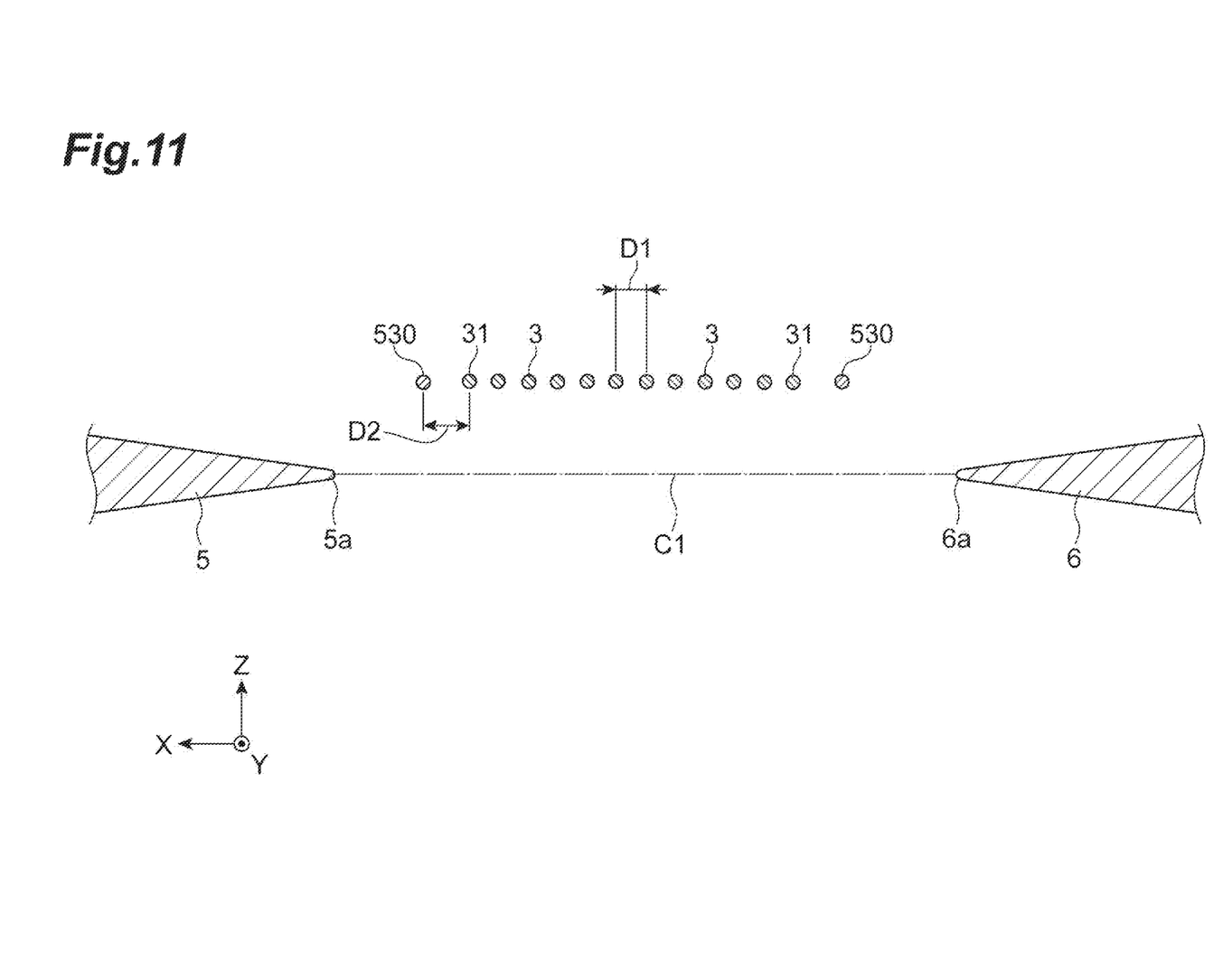
FIG. 11 is a diagram illustrating one example of displacement of the electrode rods, the shields, and the optical fibers.

The shields may be disposed, for example, as illustrated in FIG. 11. Each of shields 530 illustrated in FIG. 11 is of a columnar shape having the same diameter as that of each of the optical fibers 3. In this example, a height position of each of the shields 530 is the same as a height position of each of the optical fibers 3. In addition, a distance D2 between each of the outermost optical fibers 31 and each of the shields 530 is larger than a distance D1 respectively between the optical fibers 3 in the X direction. As one example, the distance D2 may be approximately three times the distance D1. As compared with the example illustrated in FIG. 4 or the like, the shields 530 are disposed in the vicinity of the electrode rods 5 and 6, respectively. In the example illustrated in FIG. 11, a degree at which the influence of the arc discharge is mitigate can be finely adjusted.

Configurations of the embodiment and each of the modified examples may be replaced with one another. For example, in the positions of the shields illustrated in FIG. 11, the shields illustrated in each of FIG. 8 to FIG. 10 may be disposed.

Although the examples, in each of which the shields are columnar-shaped, are shown, the present disclosure is not limited thereto. It is only required for the shields to be capable of mitigating the influence of the arc discharge against the outermost optical fibers, and for example, each of the shields may be of other columnar shape such as a quadrangular prism-shape, a hexagonal prism-shape, an octagonal prism-shape, and an elliptic columnar shape. As described above, each of the shields is formed to be of the columnar shape, thereby allowing the shields to be easily positioned as with the optical fibers.

Although the examples, in each of which each one shield is disposed between each of the outermost optical fibers and each of the electrode rods, are shown, the present disclosure is not limited thereto. Two or more shields may be disposed between each of the outermost optical fibers and each of the electrode rods. The shield may be disposed only between one of the electrode rods and the outermost optical fiber.

What is claimed is:

1. A fusion splicer for fusion-splicing mutually a first group of optical fibers and a second group of optical fibers arrayed such that an end of each fiber of the first group of optical fibers abuts on an end of a fiber of the second group of optical fibers, by arc discharge, the fusion splicer comprising:
    first and second electrode rods configured to generate the arc discharge therebetween;
    a first fiber holding part having a first plurality of V-grooves positioning the first group of optical fibers between the first and second electrode rods;
    a second fiber holding part having a second plurality of V-grooves positioning the second group of optical fibers between the first and second electrode rods;
    a first shield located between the first and second plurality of V-grooves and the first electrode rod in a first direction along a center line extending between a tip of the first electrode rod and a tip of the second electrode rod;
    a second shield located between the first and second plurality of V-grooves and the second electrode rod in the first direction; and
    an attachment covering at least part of the first and second electrode rods, the attachment holding the first shield and the second shield such that the first and second shields intersect with the center line,
    wherein the first shield and the second shield are formed of an insulating material having heat resisting properties withstanding 1000 or more degrees Celsius.

2. The fusion splicer according to claim 1, wherein the first shield includes a columnar rod extending along a second direction along which the V-grooves of the first plurality of V-grooves extend, the second direction intersecting the first direction.

3. The fusion splicer according to claim 2, wherein the second shield includes a columnar rod extending along the second direction.

4. The fusion splicer according to claim 2, wherein the columnar rod of the first shield is a cylindrical rod having a diameter equal to or larger than a diameter of each fiber of the first group of the optical fibers.

5. The fusion splicer according to claim 1, wherein the insulating material of the first shield is a ceramic material.

6. The fusion splicer according to claim 5, wherein the ceramic material includes zirconia, sapphire, or alumina.

7. The fusion splicer according to claim 1, wherein the first fiber holding part further includes a first V-groove configured to support the first shield, and the first V-groove is located next to an outermost V-groove of the first plurality of V-grooves and extends along an extending direction of the outermost V-groove.

8. The fusion splicer according to claim 1, wherein the first shield is located on a straight line extending between an outermost V-groove of the first plurality of V-grooves and the first tip of the first electrode rod when viewed from an axial direction of the first group of optical fibers.

9. The fusion splicer according to claim 1, wherein the first shield is located off a straight line connecting an outermost V-groove of the first plurality of V-grooves and the tip of the first electrode rod when viewed from an axial direction of the first group of optical fibers.

10. The fusion splicer according to claim 1, further comprising:
    a first electrode holding part configured to hold the first electrode rod; and
    a second electrode holding part configured to hold the second electrode rod,
    wherein the first electrode holding part and the second electrode holding part hold the first and second electrode rods such that the tip of the first electrode faces the tip of the second electrode, and a distance between the tips remains unchanged.

11. A method for fusion-splicing mutually a first group of optical fibers and a second group of optical fibers by a fusion splicer comprising: first and second electrode rods configured to generate an arc discharge therebetween, a first fiber holding part having a first plurality of V-grooves for positioning the first group of optical fibers between the first and second electrode rods, a second fiber holding part having a second plurality of V-grooves for positioning the second group of optical fibers between the first and second electrode rods, a first shield and a second shield each formed of an insulating material having heat resisting properties withstanding 1000 or more degrees Celsius, and an attachment covering at least part of the first and second electrode rods, the method comprising:
    arraying the fibers of the first group of optical fibers in the first plurality of V-grooves and the fibers of the second group of optical fibers in the second plurality of V-grooves such that an end of each fiber of the first group of optical fibers abuts on an end of a fiber of the second group of optical fibers and the optical fibers of the first and second groups of optical fibers are positioned between the first and second electrodes;
    holding the first shield and the second shield with the attachment such that the first shield is located between the first and second plurality of V-grooves and the first electrode rod in a first direction along a center line extending between a tip of the first electrode rod and a tip of the second electrode rod and the second shield is located between the first and second pluralities of V-grooves and the second electrode rod in the first direction, such that the first shield and the second shield intersect with the center line, and such that at least part of each shield is included in a predetermined area when viewed from an axial direction of the first group of optical fibers; and
    generating the arc discharge between the first and second electrode rods to fusion-splice the first group of optical fibers and the second group of optical fibers while maintaining the arraying of the fibers and the holding of the shields,
    wherein the predetermined area is an area delimited by a first border line and a second border line when viewed from the axial direction, the first border line being a tangent line of an outermost fiber of the first group of optical fibers arrayed closest to the first electrode rod in the first direction along the center line, the first boarder line being orthogonal to the center line and being formed on an inner side of the outermost fiber in a direction in which the fibers of the first group of optical fibers are arrayed, and the second border line being perpendicular to the center line and passing the tip of the first electrode rod.

12. The method for fusion-splicing optical fibers according to claim 11, wherein
the predetermined area is an area enclosed by the first border line, the second border line, a third border line, and a fourth border line when viewed from the axial direction,
the third border line is the center line, and
the fourth border line is another tangent line of the outermost fiber, the fourth border line being parallel to the center line.

13. The method for fusion-splicing optical fibers according to claim 11, wherein
the predetermined area is an area enclosed by the first border line, the second border line, a third border line, and a fourth border line when viewed from the axial direction,
the third border line is one tangent line of the outermost fiber,
the fourth border line is another tangent line of the outermost fiber, and
both of the one tangent line and the another tangent line are parallel to the center line.

14. The method for fusion-splicing optical fibers according to claim 11, wherein at least part of at least one shield is located on a straight line extending from the tip of the first electrode rod to the outermost fiber when viewed from the axial direction.

15. The method for fusion-splicing optical fibers according to claim 11, wherein at least one shield includes a columnar rod.

16. The method for fusion-splicing optical fibers according to claim 15, wherein the columnar rod of the at least one shield is a cylindrical rod having a diameter equal to or larger than a diameter of each fiber of the first group of the optical fibers.

17. A fusion splicer for fusion-splicing mutually a first group of optical fibers and a second group of optical fibers arrayed such that an end of each fiber of the first group of optical fibers abuts on an end of a fiber of the second group of optical fibers, by arc discharge, the fusion splicer comprising:
first and second electrode rods configured to generate the arc discharge therebetween;
a first fiber holding part having a first plurality of V-grooves positioning the first group of optical fibers between the first and second electrode rods;
a second fiber holding part having a second plurality of V-grooves positioning the second group of optical fibers between the first and second electrode rods; and
a first shield located between the first and second plurality of V-grooves and the first electrode rod in a first direction along a center line extending between a tip of the first electrode rod and a tip of the second electrode rod, the first shield being formed of an insulating material having heat resisting properties withstanding 1000 or more degrees Celsius, wherein
the first fiber holding part further includes a first V-groove configured to support the first shield, and the first V-groove is located next to an outermost V-groove of the first plurality of V-grooves and extends along an extending direction of the outermost V-groove.

18. The fusion splicer according to claim 17, further comprising a second shield located between the first and second plurality of V-grooves and the second electrode rod in the first direction, wherein
the second shield is formed of the insulating material having heat resisting properties withstanding 1000 or more degrees Celsius, and
each of the first and the second shields includes a columnar rod extending along a second direction along which the first plurality V-grooves extend, the second direction intersecting the first direction.

19. The fusion splicer according to claim 18, further comprising an attachment covering at least part of the first and second electrode rods, the attachment holding the first shield and the second shield such that the first and second shields intersect with the center line.

* * * * *